(12) United States Patent
Bijelovic et al.

(10) Patent No.: US 9,105,362 B2
(45) Date of Patent: Aug. 11, 2015

(54) APPARATUS AND A METHOD FOR CLEANING OF A NUCLEAR FUEL ELEMENT

(75) Inventors: Ilija Bijelovic, Västerås (SE); Stefan Arlmark, Västerås (SE)

(73) Assignee: Westinghouse Electric Sweden AB, Vasteras (SE)

( * ) Notice: Subject to any disclaimer, the term of this patent is extended or adjusted under 35 U.S.C. 154(b) by 505 days.

(21) Appl. No.: 13/499,093

(22) PCT Filed: Sep. 29, 2010

(86) PCT No.: PCT/SE2010/051047
§ 371 (c)(1),
(2), (4) Date: Apr. 26, 2012

(87) PCT Pub. No.: WO2011/040873
PCT Pub. Date: Apr. 7, 2011

(65) Prior Publication Data
US 2012/0199161 A1    Aug. 9, 2012

(30) Foreign Application Priority Data

Oct. 1, 2009 (SE) .................... 0950720-3

(51) Int. Cl.
*G21C 19/20* (2006.01)
*G21C 17/06* (2006.01)

(52) U.S. Cl.
CPC ............... *G21C 19/20* (2013.01); *G21C 17/06* (2013.01)

(58) Field of Classification Search
None
See application file for complete search history.

(56) References Cited

U.S. PATENT DOCUMENTS

| 4,610,838 | A | * | 9/1986 | Gasparro et al. | 376/248 |
| 4,683,109 | A |   | 7/1987 | Cooper, Jr. et al. | |
| 5,087,411 | A | * | 2/1992 | Guironnet et al. | 376/310 |
| 5,703,916 | A | * | 12/1997 | Wilhelm et al. | 376/260 |
| 6,231,682 | B1 |  | 5/2001 | Gabelgaard | |
| 2004/0099294 | A1 |  | 5/2004 | Gross et al. | |
| 2005/0027165 | A1 | * | 2/2005 | Rovegno | 600/154 |
| 2006/0042688 | A1 | * | 3/2006 | Sebor | 137/114 |

FOREIGN PATENT DOCUMENTS

| DE | 19914218 C1 | * | 7/2000 |
| EP | 2062266 A1 |   | 5/2009 |
| JP | 1982-061999 A | | 4/1982 |
| JP | H05196796 A |  | 8/1993 |
| JP | 1994-207765 A | | 7/1994 |
| JP | 2006-038242 A | | 2/2006 |

(Continued)

OTHER PUBLICATIONS

English Machine Translation of DE 19914218.*
Notice of Reasons for Rejection from corresponding Japanese Application No. 2012-532048, dated Jul. 17, 2014.

(Continued)

*Primary Examiner* — Nicole Blan
(74) *Attorney, Agent, or Firm* — MKG, LLC

(57) ABSTRACT

The present invention relates to an apparatus and a method for cleaning a nuclear fuel element in a liquid filled space. The fuel element comprises an inner space with an opening. The apparatus comprises a connecting element, which is adapted to be connected to a portion of the fuel element, which comprises said opening and flow means, which is adapted to create, at least during a part of a cleaning process of the fuel element, a liquid flow through inner space of the fuel element via said opening.

15 Claims, 4 Drawing Sheets

(56) References Cited

FOREIGN PATENT DOCUMENTS

| | | | |
|---|---|---|---|
| JP | 2006-0284302 A | | 10/2006 |
| JP | 2006284302 A | * | 10/2006 |
| WO | 0148760 A1 | | 7/2001 |

OTHER PUBLICATIONS

Supplementary European Search Report from corresponding European Patent Application No. 10820912.3, dated Nov. 12, 2014.

* cited by examiner

APPARATUS AND A METHOD FOR CLEANING OF A NUCLEAR FUEL ELEMENT

TECHNICAL FIELD

The present invention relates to an apparatus and a method for cleaning of a nuclear fuel element in a liquid filled space, wherein the fuel element comprises an internal space with an opening, and wherein the apparatus comprises a connecting element, which is adapted to be connected to a portion of the fuel element, which comprises the opening and flow means that is adapted to create, at least during a part of a cleaning process of the fuel element, a liquid flow through the inner space of the fuel element via said opening.

BACKGROUND

Nuclear fuel elements for a BWR (Boiling Water Reactor) have a tubular shape and have an inner space that comprises spacers, fuel rods, etc. In connection with maintenance and repair work in systems that are connected to the reactor tank, there is a risk that metal particles, flakes, fibers, etc. may be formed, which during subsequent operation can be transported by the reactor water to the reactor tank. Also during times when the reactor tank is opened, there is a risk that particles may fall down into the reactor tank. During a subsequent operation, such particles could then be circulated in the reactor tank with the reactor water. In order to capture such particles, filters are generally positioned at appropriate places where the reactor water passes. Small particles however, can become trapped inside the fuel elements and cause abrasion damage to sensitive parts such as the fuel rods. Particles that fasten to the insides of the fuel elements do not circulate with the reactor water and, therefore, they can not be captured by conventional filters.

The reactor water contains impurities derived mainly from corroded materials. When the reactor water during operation comes in contact with and is heated by the fuel rods, such impurities in the reactor water form deposits on the outer surfaces of the fuel rods. The deposits result in the reactor water experiencing an increased pressure drop in the fuel elements and a reduced heat exchange with the fuel rods.

SUMMARY

In one aspect of the present invention, an apparatus that allows cleaning of a nuclear fuel element in a liquid filled space in a simple and effective way is provided.

Such cleaning is achieved with the apparatus initially defined as comprising a flow channel. The flow channel has an opening in connection with a connecting element. A flow means is adapted to create, at least during a part of a cleaning process of the fuel element, a liquid flow from the inner space of the fuel element to the flow channel of the apparatus. A filter element is positioned in the flow channel, the filter element being adapted to capture particles and deposits that are transported with the liquid flow from the inner space of the fuel element. Spacers, fuel rods and other components in the fuel element form relatively narrow passages for the circulating reactor water. In order to detach particles that fasten inside the fuel element, the apparatus is thus connected to the fuel elements. When the liquid means of the apparatus is activated a liquid flow is created through the fuel element. By creating a liquid flow that may be greater or less than the liquid flow through the fuel element during operation, such particles can be detached and transported with the liquid flow out of the fuel element via the opening. Advantageously, the flow is alternating so that the particles that have fastened inside the fuel element are wrenched loose. With such a liquid flow, particles and other deposits on particularly the fuel rods inside the fuel element can be detached and transported by the liquid flow out of the fuel element.

According to one aspect illustrated herein the apparatus comprises the flow channel, which has an opening in connection to the connecting element and in which the flow means is adapted to create, at least during a part of a cleaning process of the fuel element, a liquid flow from the inner space of the fuel element to the flow channel of the apparatus. Thereby, the liquid from the inner space of the fuel element can be sucked into the apparatus. The apparatus further comprises a filter element in the flow channel, which is adapted to capture particles and deposits that are transported by the liquid flow from the inner space of the fuel element. By arranging a fine mesh filter element in the flow passage, the filter element can also capture relatively small particles that are detached from the inner space of the fuel element. The filter element is advantageously removably mounted in the apparatus so that it is replaceable. Thereby, it can be removed and emptied of particles or replaced with a new one after use.

According to another aspect illustrated herein, the flow means is adapted to create a liquid flow through the inner space of the fuel element, which varies according to a predetermined program during a cleaning process of the fuel element. In order to detach particles and deposits in an effective manner, the flow through the fuel element is varied. This can be done by a preliminary pre-determined program. Special programs can be used for cleaning fuel elements of different kinds. The flow means is advantageously adapted to create an intermittent liquid flow through the inner space during a cleaning process of the fuel element. By periodically interrupting the flow through the fuel element during a cleaning process, an intermittent liquid flow through the fuel element is created, which detaches particles and deposits from the inner space of the fuel element.

According to another aspect illustrated herein, the flow means includes a pump, which is arranged in the flow channel. One such suitable pump can suck a liquid flow through the fuel element. A flow valve may be arranged in the flow channel in a position upstream of the pump with respect to an intended flow direction in the flow channel, the flow valve being adjustable to a first position in which the flow valve prevents the pump from sucking liquid from the inner space of the fuel element and to a second position in which the flow valve allows the pump to suck liquid from the inner space of the fuel element. With such a flow valve, an intermittent liquid flow through the fuel element can be created in a simple manner and without the pump being turned off and turned on.

According to another aspect illustrated herein, the flow valve has a construction so that in a first position, the pump is connected with an opening to the surrounding liquid. The flow valve thus supplies the pump with an alternative source from which the pump can suck liquid when the connection with the fuel element is interrupted. Therefore, the pump does not need to be turned off when the flow valve is set in the first position. Advantageously, the flow valve has a construction so that it in the first position connects the inner space of the fuel element with an opening to the surrounding liquid. When the flow valve interrupts the connection of the pump with the fuel element, there is a liquid flow in the fuel element. The flow valve creates in this case an alternative route for this liquid flow. The liquid flow in the fuel element is therein not slowed abruptly when the flow valve is converted to the first position. The prevents the liquid flow from creating forces that can dislodge the apparatus from the connecting position on the fuel element. Also when the fuel element is not activated, ingoing components can have a residual elevated temperature, which also generates a liquid flow upwards through the fuel element. To permit such a liquid flow allows for cooling the fuel element.

According to another aspect illustrated herein, the apparatus comprises a force element that is adapted to set the flow valve in the first position and in the second position. Advantageously, this force element comprises a first component, which operates with continuous power to set the flow valve in the first position and a second component, which in an activated state operates in an opposite direction with more power than the first component in order to set the flow valve in the second position. The first component can be a spring element and the second component can be a pneumatic cylinder. Of course, the present invention is not so limited, as other types of components can be used to set the flow valve between the first position and the second position.

According to another aspect illustrated herein, the apparatus comprises a joining portion that allows for a removable connection of the connecting elements with different shapes. For the apparatus to, in an effective way, be able to suck liquid from a fuel element, a tight connection is established between the connecting element and the fuel element. If the apparatus is to be used to clean different types of fuel elements, the apparatus can be provided with different types of connecting elements that have a shape adapted to a specific type of fuel elements. The connecting element can comprise a cup-shaped portion that is adapted to be set on or slipped over an end portion of the fuel element. Such a cup-shaped portion enables establishing a tight connection between the apparatus and the fuel element. The apparatus can comprise a gripping portion that is adapted to be gripped by a hoisting device in order to lift the apparatus to a connecting position on a fuel element and in order to lift the apparatus from the connecting position on the fuel element after a cleaning process. An existing charging machine in a reactor facility can be used in order to apply and move the apparatus between cleaning processes of individual fuel elements in a reactor tank.

Another aspect of the present invention resides in a method for cleaning a nuclear fuel element in a liquid filled space, wherein the fuel element comprises an inner space with an opening. The method comprises the steps of connecting an apparatus to a portion of the fuel element, which comprises an opening, and creating, at least during a part of a cleaning process of the fuel element, a liquid flow through an inner space with help of the apparatus, to create, at least during a part of a cleaning process of the fuel element, a liquid flow from the inner space of the fuel element to a flow channel of the apparatus, which has an opening in connection with the connecting element. The method further comprises the step of capturing particles and deposits transported by the liquid flow from the inner space of the fuel element into a filter element in the flow channel of the apparatus. With such a liquid flow, particles and deposits can be detached from the inner space of the fuel element and be captured in the filter element.

Advantageously, an intermittent liquid flow through the inner space of the fuel element is created with the help of the attached apparatus. Thereby, a cleaning process of the inner space of the fuel element is provided. The method can also comprise the step of connecting the apparatus to a fuel element, which is arranged in a reactor tank. Therein, the fuel elements do not need to be lifted out of the reactor tank when they are to be cleaned. However, it is possible to connect the apparatus to fuel elements, which have been lifted out of the reactor tank and placed for example in a reactor pool.

DETAILED DESCRIPTION

Figure 1:
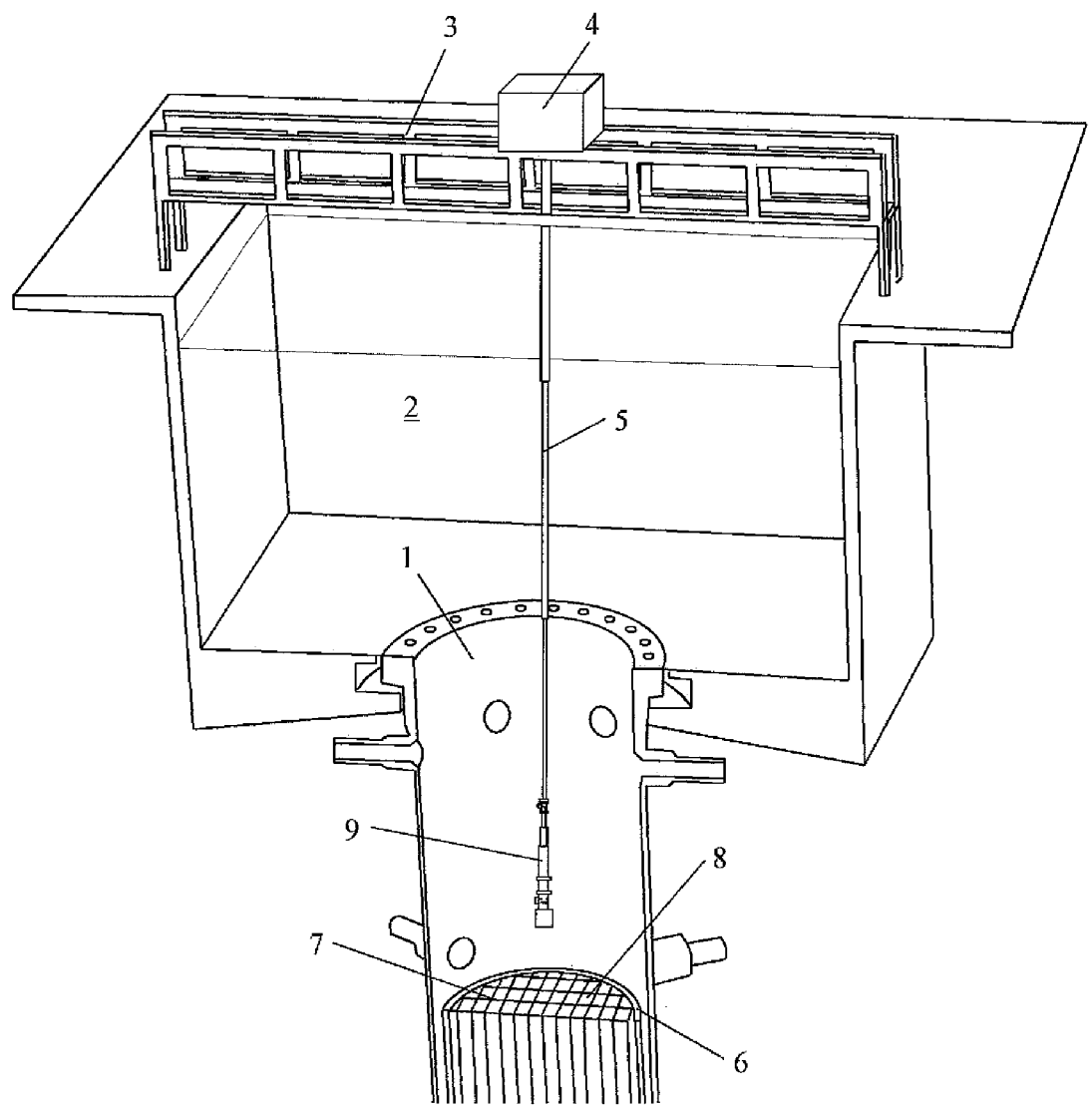
FIG. 1 is a cutaway view of an apparatus according to the present invention in a reactor tank.

FIG. 1 shows a reactor tank 1 for a boiling water reactor BWR. The reactor tank 1 is shown in an open position and is arranged at a bottom surface of a reactor pool 2. The reactor tank 1 and the reactor pool 2 are filled with water. A service bridge 3 spans over the reactor pool 2. The service bridge 3 is provided with a movable charging machine 4 having a telescopic boom 5 with which it is possible to lift components up and down in the reactor tank 1. As shown, the reactor tank 1 has been partially emptied of internal components. The internal components, which are lifted out of the reactor tank 1, can be placed in different positions in the reactor pool 2. The fuel core, which is arranged in a moderator tank 6, is in this case left in the reactor tank 1. A frame 7 forms a grid at an upper portion of the moderator tank 6 that defines the positions of a large number of fuel elements 8.

During maintenance and repair work in a system that is connected to the reactor tank 1, there is a risk that metal particles, flakes, fibers, etc. are formed, which during subsequent operations are transported by the reactor water to the reactor tank 1. Also during times when the reactor tank 1 is opened, there is a risk that particles fall into the reactor tank 1. During a subsequent operation, such particles may be circulated in the reactor tank 1 with the reactor water. In order to purify the reactor water from particles, a filter is arranged at appropriate positions in the reactor tank 1. Small particles, however, can become trapped inside the fuel elements 8. Because these particles are not circulated by the reactor water, they are not removed by conventional filters. The reactor water contains inevitable impurities that originate mainly from corrosion of material that is in contact with the circulating reactor water. During operation such impurities in the reactor water build deposits on the outer surfaces of the fuel rods.

FIG. 1 further shows an apparatus 9, which is adapted to clean internal particles and deposits from the fuel elements 8. The apparatus 9 is applied with help of the charging machine 4 at an upper end portion of the fuel elements 8 in the reactor tank 1. The fuel elements 8 are in this case left in the reactor tank 1. It is possible, however, to lift up the fuel elements 8 and apply the apparatus 9 at the fuel elements 8 in an arbitrary position in the reactor pool 2 or in a connecting fuel pool.

Figure 2:
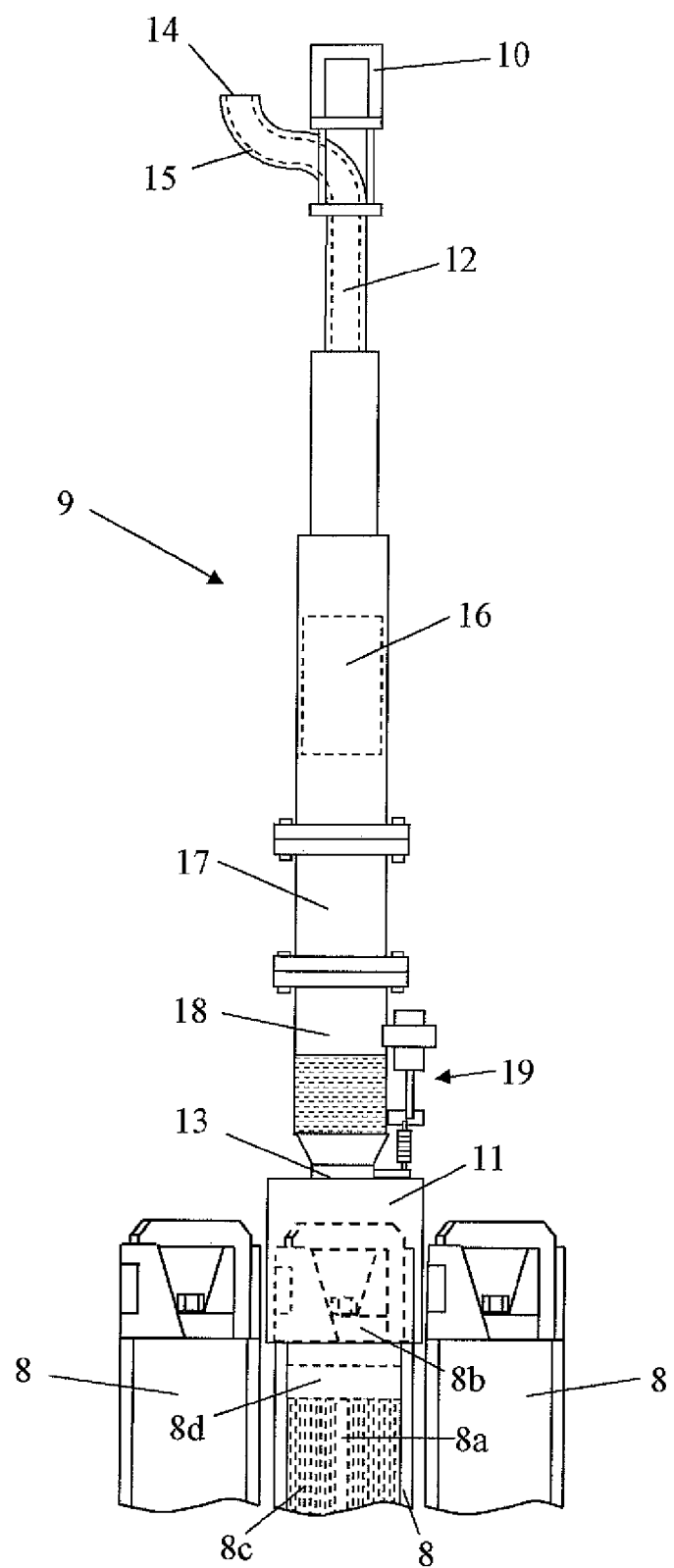
FIG. 2 is a side view of the apparatus in a position when the apparatus is connected to a fuel element.

FIG. 2 shows the apparatus 9 and the top portion of a fuel element 8 in more detail. The fuel elements 8 comprise elongated tubular elements with an inner space $8a$, which contain fuel rods $8c$ and spacers to keep the fuel rods in a desired mutual position in the inner space $8a$. A top plate $8d$ holds a top end of the fuel rods $8c$ in a desired position. During operation, the hot fuel rods $8c$ heat up the reactor water that circulates through the inner space $8a$. The resulting steam and the heated water rise up in the inner space $8a$ and out through an outlet opening 8b at an upper end of the fuel elements 8. New reactor water is fed into the inner space 8a via an inlet opening, which is situated at a lower end of the fuel elements 8.

The apparatus 9 has a relatively elongated construction and comprises at a first end a gripping portion 10 that is adapted to be gripped by the charging machine 4 when the apparatus 9 is applied to the fuel element 8. The apparatus 9 comprises at a second opposite end, a connecting element in the form of an intake cover 11. The intake cover 11 has a cup-shaped portion with an internal shape and size that corresponds substantially to the outer shape and size of the upper end portion of the fuel element 8. The intake cover 11 can thereby (with help of the charging machine 4) be lowered down and placed on or otherwise be affixed to the top end portion of the fuel element 8. The intake cover 11 can be provided with suitable shaped control surfaces to facilitate positioning of the intake cover 11 on the fuel element 8. The apparatus 9 comprises an elongated flow channel 12, which extends from an inlet opening 13 in the intake cover 11 to an outlet opening 14 in an outlet portion 15. The gripping portion 10 is in this case attached to the outlet portion 15. The outlet portion 15 has a curved shape so that the outlet opening 14 is located alongside the gripping portion 10. The device comprises a schematically shown pump 16, which is adapted to transport the reactor water in the flow channel 12. Between the pump 16 and the intake cover 11, the apparatus 9 comprises a tubular portion 17 that encloses a filter and a tubular portion 18 that encloses a flow valve. The flow valve is controlled by a force element 19.

Figure 3:
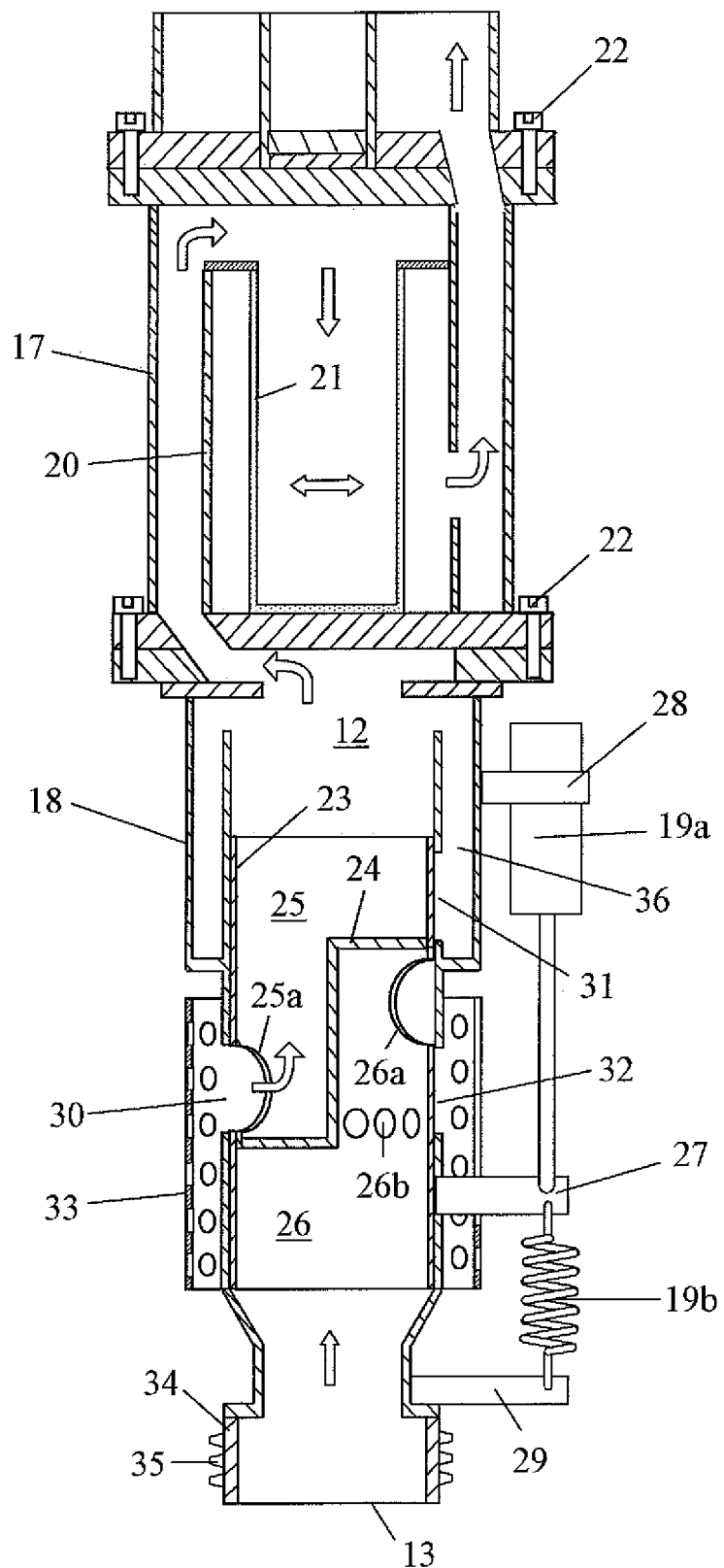
FIG. 3 is a cross-sectional view through a filter element and a flow valve of the apparatus when the apparatus is in a first position.
Figure 4:
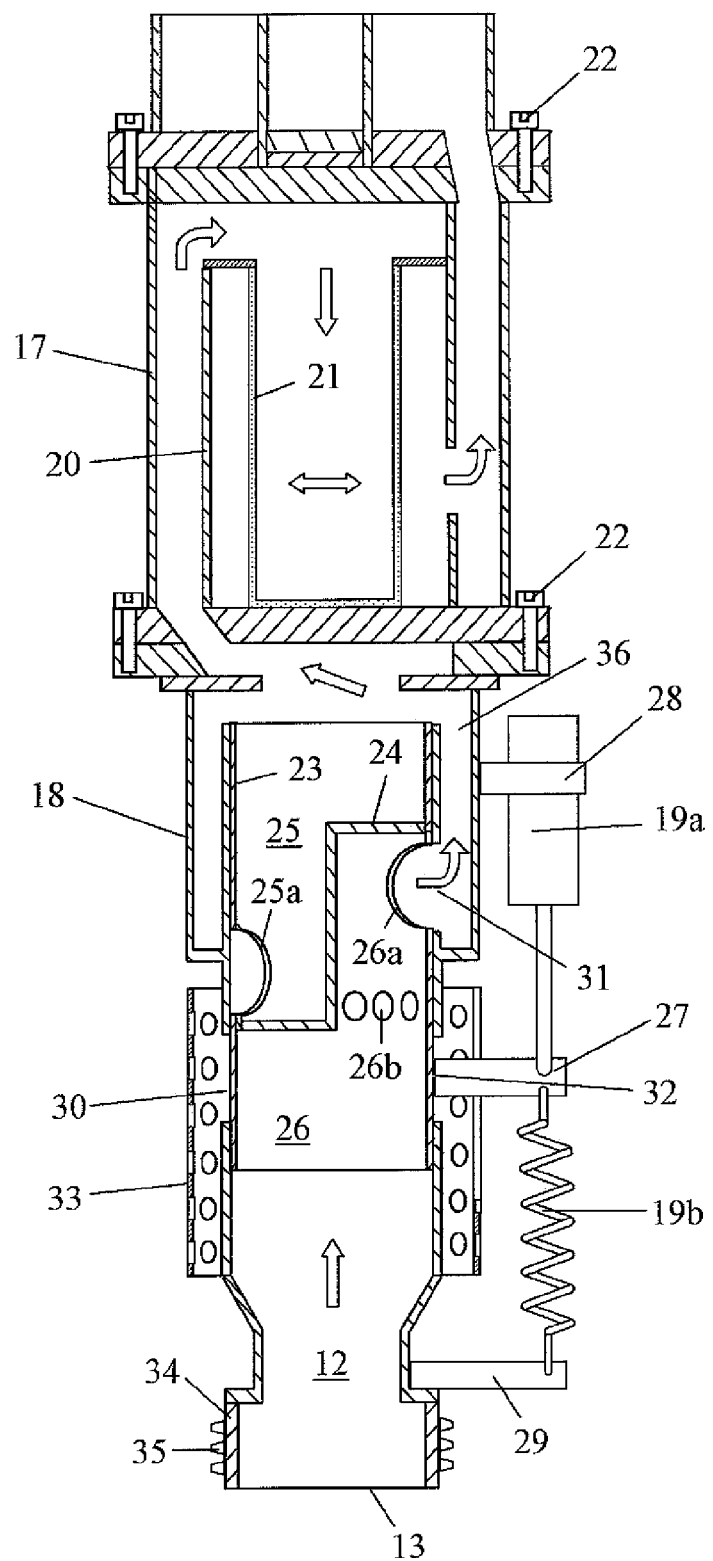
FIG. 4 is a cross-sectional view through the apparatus when the flow valve has shifted to a second position.

FIGS. 3 and 4 show cross-sectional views of the above mentioned tubular portions 17, 18 of the apparatus 9. The tubular portion 17 comprises one internal wall element 20 forming a space for receiving a filter element 21, which may include a filter basket. The tubular portion 17 is attached by means of removable attachment elements, such as screws 22. Thus, the tubular portion 17 can be removed from the apparatus when the filter element 21 needs to be cleaned or replaced.

The tubular portion 18 comprises a flow valve in the form of a shiftably arranged valve body 23. The valve body 23 comprises a cylindrical formed wall element and an internal wall portion 24 that divides an internal space of the valve body 23 into a first chamber 25 and a second chamber 26. The first chamber 25 is provided with a peripheral opening 25a. The second chamber 26 is provided with a first peripheral opening 26a and several other smaller peripheral openings 26b arranged at a different level than the first peripheral opening 26a. A radially protruding control element 27 is firmly attached to the valve body 23.

The force elements 19 constitute a pneumatic cylinder 19a and a spring element 19b. The pneumatic cylinder 19a is firmly attached to the apparatus 9 by means of a mounting element 28 and has a movable portion that is attached to the control element 27. The spring element 19b is, at one end, firmly attached to the apparatus 9 by means of a mounting element 29 and connected to the control element 27 at an opposite end. The spring element 19b operates to shift the control element 27 and the valve body 23 downward to a first position as is shown in FIG. 3. When the pneumatic cylinder 19 is activated the control element 27 shifts upwards against the effect of the spring element 19b, to a second position as is shown in FIG. 4.

The tubular portion 18, which encloses the valve body 23 has a first opening 30, a second opening 31 and a third opening 32. A flow element 33 is arranged around the tubular portion 18 at the height of the first opening 30 and the third opening 32. The tubular portion 18 comprises at a lower end a joining portion 34 for application of an intake cover 11. The joining portion 34 can comprise threads 35 or other mounting elements that allow a removable application of an intake cover 11. Thereby, different intake covers 11 with suitable shapes can be attached to the apparatus 9 when the apparatus is to be connected to different types of fuel elements 8.

When the fuel elements 8 in a reactor tank 1 are to be cleaned, the apparatus 9 is attached with help of the grip handle 10 of a gripper of the charging machines telescopic boom 5. The charging machine 4 moves the apparatus 9 to a position substantially vertically above the fuel elements 8 to be cleaned with help of coordinate information or with information from cameras or similar detection elements, which are arranged at appropriate positions on the apparatus 9. The apparatus 9 is then immersed into the fuel element 8 so that the intake cover 11 encloses the upper end portion of the fuel element 8 and an opening 8b for the inner space of the fuel element 8a. When the apparatus 9 is connected in a desired way to the fuel element 8, the pump 16 is activated. This can be done by an operator by means of a suitable control device. The operator can stand on the maneuver bridge 3 or in position at the side of the reactor pool 2. The control device can be equipped with cables that transmit control signals and power to the pump 16.

When the pump 16 is activated, the valve body 23 is preferably in the first position as is shown in FIG. 3. In this position, the opening of the valve body 25a to the first chamber 25 is located in a corresponding position as the first opening of the tubular portion 30. Thereby, the pump 16 sucks in, in this case, the surrounding reactor water via the openings 30, 25a to the first chamber 25. From the first chamber 25, the reactor water is sucked further into the flow channel of the apparatus 12 up to the tubular portion 17 and down into the compartment with the filter element 21. The reactor water is then sucked through the filter element 21 and further upwards in the flow channel 12 in the direction of the pump 16 according to the arrows in FIG. 3. From the pump 16 the reactor water is pressed upwards in the flow channel 12 and out through the outlet opening 14 in the outlet portion 15. The second chamber of the valve body 26 is in constant contact with the intake cover 11 and the inner space of the fuel element 8a. Also, when the reactor is turned off, the fuel rods can have a residual elevated temperature, which creates an upward flow of the reactor water through inner space of the fuel element 8a. Such a liquid flow is routed from the inner space of the fuel element 8a to the second chamber of the valve body 26. In this case, the other smaller openings of the second chamber 26b of the valve body 26 are arranged in a position that corresponds to the position of the third opening of the tubular portion 32. Thereby, such a possible ascending flow of the reactor water can be routed from the second chamber 26 to the surrounding reactor water via the opening 32. When the valve body 23 is in the first position, the pump 16 in the apparatus 9 creates no flow of the reactor water through the inner space of the fuel element 8a.

After the valve body 23 has been on in a specified period, which may be within the range of 1-3 seconds, the pneumatic cylinder 19a is activated. The pneumatic cylinder 19a provides a force on the control element 27 so that the valve body 23 is set to the second position as is shown in FIG. 4. When the valve body 23 is in the second position, the second chamber of the valve body 26 connects, via opening 26a, to the second opening of the tubular portion 31. The second opening of the tubular portion 31 is connected to a channel portion 36, which is connected to the pump 16. At the same time, the connection between the second chamber 26 and the surrounding reactor water is interrupted because the opening of the second chamber 26b is shifted from the third opening of the tubular portion 32. At the same time, the connection between the first chamber 25 with the surrounding water reactor is interrupted because the first opening of the chamber 25a is shifted from the first opening of the tubular portion 30. Accordingly, the pump 16 can no longer suck in the reactor water through the first opening of the tubular portion 30.

In the second position of the valve body, the pump 16 sucks in the reactor water from the inner space of the fuel element 8a. The reactor water is sucked into the apparatus 9 with help of the intake cover 11, which is connected to the upper end portion of the fuel elements 8. The reactor water is routed from the intake cover 11 into the flow channel of the apparatus 12 via inlet opening 13. Thereafter, the reactor water reaches the second chamber 26. The reactor water is sucked into the channel portion 36 from the tubular portions 18 and from the second chamber 26. The reactor water enters the second chamber 26 through the openings 26a, 31. Thereafter, the reactor water is sucked up to the filter element 21. Any particles or deposits from the fuel element 8 are trapped in the filter element 21. The reactor water is pumped further up and out through outlet opening 14 in the outlet portion 15. After a specified period, which may be within the range of 10-15 seconds, the pneumatic cylinders 19a are de-activated, and the valve body 23 is shifted back to the first position by the spring element 19b. During a cleaning process of a fuel element 8, the valve body 23 is shifted a predetermined number of times, which may be within the range of 5-15 times, between the first position and the second position.

A cleaning process of a fuel element of the present apparatus 9 comprises thus sucking the reactor water through the inner space of the fuel element 8a with a pump 16. Thereby, a liquid flow through the fuel element 8 is created that can detach any particles fastened inside the fuel element and deposits formed on the fuel rod surfaces. To further enhance this effect, the valve body 23 of the apparatus 9 is shifted several times between the above mentioned positions. Thereby, an intermittent flow through the inner space of the fuel element 8a is provided. The intermittent flow of the reactor water through the inner space of the fuel element 8a enhances the apparatus's ability to detach particles fastened inside the fuel element 8 and to detach deposits from the fuel rods surfaces 8c. Such detached particles and deposits are transported by the reactor water into the apparatus 9, where they are captured in the filter element 21. When a cleaning process of a fuel element is finished, the charging machine 4 is activated, which moves the apparatus 9 to a not yet cleaned fuel element 8 of the reactor core.

While the invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the foregoing description.

The invention claimed is:

1. An apparatus for cleaning a nuclear fuel element in a liquid filled space, wherein the fuel element comprises an inner space with an opening, and wherein the apparatus comprises a connecting element, which is adapted to be connected to a portion of the fuel element comprising said opening and flow means, which is adapted to at least during a part of a cleaning process of fuel element create a liquid flow through the inner space of the fuel element via the said opening, further comprising the apparatus having a flow channel, which has an opening in connection to the connecting element and that said flow means is adapted to create, at least during a part of a cleaning process of the fuel element, a liquid flow from the inner space of the fuel element to the flow channel of the apparatus and that the apparatus comprises a filter element in the flow channel, which is adapted to capture particles and deposits transported by the liquid flow from the inner space of the fuel element;

said flow means comprises a pump, which is arranged in the flow channel; and said flow means comprises a flow valve in the flow channel, the flow valve being arranged in the flow channel in a position upstream of the pump with respect to an intended flow direction in the flow channel, wherein the flow valve is movable in the channel between a first position and a second position, the first position defining a first flow path from a liquid surrounding the apparatus to the pump, wherein in the first position the flow valve defines a first barrier in the flow channel between the pump and the inner space; and wherein the second position defines a second flow path from the inner space to the pump and in the second position the flow valve defines a second barrier between the pump and the liquid surrounding the apparatus.

2. The apparatus according to claim 1, wherein the filter element is removably mounted in the apparatus so that it is replaceable.

3. The apparatus according to claim 1, wherein said flow means is adapted to create the liquid flow through the inner space of the fuel element, and which varies according to a predetermined program during a cleaning process of the fuel element.

4. The apparatus according to claim 1, wherein said flow means is adapted to create an intermittent liquid flow through the inner space during a cleaning process of a fuel element.

5. The apparatus according to claim 1, further comprising a force element that is adapted to set the flow valve in the first position and in the second position.

6. The apparatus according to claim 1, further comprising a joining portion that allow for a removable connection of connecting elements with different constructions.

7. The apparatus according to claim 6, wherein the connecting element comprises a cup-shaped portion that is adapted to be set on or slipped over an end portion of the fuel element.

8. The apparatus according to claim 1, a gripping portion that is adapted to be gripped by a hoisting device in order to apply the apparatus at a fuel element and in order to lift away the apparatus from the fuel element after a cleaning process of the fuel element.

9. The apparatus according to claim 1, wherein in the first position the flow valve defines a third flow path, the third flow path being between the inner space and the liquid surrounding the apparatus.

10. The apparatus according to claim 1, wherein in the second position the flow valve defines a third barrier between the inner space and the liquid surrounding the apparatus.

11. A method for cleaning a nuclear fuel element in a liquid filled space, wherein the fuel element comprises an inner space with an opening, providing an apparatus for cleaning a nuclear fuel element, the apparatus comprising a connecting element, a flow channel having an opening in fluid communication with the connecting element, a filter element in the flow channel, flow means comprising a pump arranged in the flow channel, the flow means comprising a flow valve in the flow means, the flow valve being arranged in the flow channel in a position upstream of the pump with respect to an intended flow direction in the flow channel;

connecting the apparatus to a portion of the fuel element, which comprises said opening;

creating with the apparatus, at least during a part of a cleaning process of the fuel element, a liquid flow through said inner space;

creating with the apparatus, at least during a part of a cleaning process of the fuel element, a liquid flow from the inner space of the fuel element to the flow channel of the apparatus;

capturing particles and deposits transported by the liquid flow from the fuel elements inner space into the filter element;

adjusting the flow valve to a first position in which the flow valve establishes a first bather between the pump and the inner space of the fuel element and the flow valve establishes a first flow path between the pump and a liquid surrounding the apparatus; and adjusting the flow valve to a second position in which the flow valve establishes a second flow path between the pump and the inner space of the fuel element and the flow valve establishes a second barrier between the liquid surrounding the apparatus and the pump.

12. The method according to claim 11, wherein the step of creating a liquid flow comprises creating an intermittent liquid flow through the inner space of the fuel element with the help of the apparatus.

13. The method according to claim 11, wherein the step of connecting an apparatus to a portion of a fuel element comprises connecting the apparatus to a fuel element, which is arranged in a reactor tank.

14. The method according to claim 11, wherein in the first position the flow valve establishes a third flow path, the third flow path being between the inner space and the liquid surrounding the apparatus.

15. The method according to claim 11, wherein in the second position the flow valve establishes a third barrier between the inner space and the liquid surrounding the apparatus.

* * * * *